(12) United States Patent
Williams

(10) Patent No.: US 10,513,051 B2
(45) Date of Patent: *Dec. 24, 2019

(54) MIXING SECTION FOR PLASTIC EXTRUSION SCREW

(71) Applicant: Reifenhauser GmbH & Co. KG, Maschinenfabrik, Toisdorf (DE)

(72) Inventor: Terry Wayne Williams, Andale, KS (US)

(73) Assignee: Reifenhäuser GmbH & Co. KG, Maschinenfabrik (DE)

( * ) Notice: Subject to any disclaimer, the term of this patent is extended or adjusted under 35 U.S.C. 154(b) by 3 days.

This patent is subject to a terminal disclaimer.

(21) Appl. No.: 15/704,763

(22) Filed: Sep. 14, 2017

(65) Prior Publication Data

US 2018/0126596 A1 May 10, 2018

Related U.S. Application Data

(63) Continuation of application No. 14/600,852, filed on Jan. 20, 2015, now Pat. No. 9,764,496.

(Continued)

(51) Int. Cl.
| | |
|---|---|
| *B29B 7/42* | (2006.01) |
| *B29C 48/53* | (2019.01) |
| *B29C 48/59* | (2019.01) |
| *B29C 48/65* | (2019.01) |
| *B29C 48/67* | (2019.01) |

(Continued)

(52) U.S. Cl.
CPC ............ *B29B 7/429* (2013.01); *B29B 7/421* (2013.01); *B29B 7/482* (2013.01); *B29C 48/53* (2019.02); *B29C 48/59* (2019.02); *B29C 48/65* (2019.02); *B29C 48/67* (2019.02); *B29C 48/832* (2019.02)

(58) Field of Classification Search
CPC ..... B29B 7/429; B29B 7/482; B29C 47/6018; B29C 47/6075; B29C 47/625; B29C 47/64; B29C 47/822
See application file for complete search history.

(56) References Cited

U.S. PATENT DOCUMENTS 3,486,192 A * 12/1969 Le Roy ............... B29C 47/6043
366/82
3,587,450 A * 6/1971 Smith et al. ............ B29C 47/60
100/117

(Continued)

OTHER PUBLICATIONS

Indian Office Action for Application No. 3765/KOLNP/2015 dated Apr. 24, 2019.

*Primary Examiner* — Tony G Soohoo
(74) *Attorney, Agent, or Firm* — Tarolli, Sundheim, Covell & Tummino LLP

(57) ABSTRACT

An mixing section for an extrusion screw has an inlet end and an outlet end as well as alternating wiping lands and barrier lands. The wiping lands have a greater helix angle than the barrier lands. The wiping lands and the barrier lands define inlet channels which narrow toward the outlet end and outlet channels which widen toward the outlet end. A helical pattern of mixing channels is cut into the wiping lands and the barrier lands. The mixing channels may be oriented generally at approximately right angles to the wiping lands and the barrier lands. A portion of the extrudate encounters the inside wall surfaces of the mixing channels and changes direction which improves the mixing of the extrudate.

13 Claims, 4 Drawing Sheets

Related U.S. Application Data

(60) Provisional application No. 61/928,855, filed on Jan. 17, 2014.

(51) Int. Cl.
  *B29C 48/80* (2019.01)
  *B29B 7/48* (2006.01)

(56) References Cited

U.S. PATENT DOCUMENTS

| | | | | |
|---|---|---|---|---|
| 3,652,064 A | * | 3/1972 | Lehnen | B29C 47/60 198/661 |
| 3,788,614 A | * | 1/1974 | Gregory | B29C 47/6043 366/82 |
| 3,941,535 A | * | 3/1976 | Street | B29B 7/429 425/208 |
| 4,085,461 A | * | 4/1978 | Maillefer | B29C 47/60 366/90 |
| 4,227,870 A | * | 10/1980 | Kim | B29C 47/60 425/208 |
| 4,330,214 A | * | 5/1982 | Willert | B29C 47/60 366/78 |
| 4,405,239 A | * | 9/1983 | Chung | B29C 47/60 198/661 |
| 4,639,143 A | * | 1/1987 | Frankland, Jr. | B29C 47/6043 366/322 |
| 4,752,136 A | * | 6/1988 | Colby | B29C 45/60 366/323 |
| 4,944,906 A | * | 7/1990 | Colby | B29C 45/0001 264/101 |
| 4,964,730 A | * | 10/1990 | Alzner | B29C 47/60 366/81 |
| 5,215,764 A | * | 6/1993 | Davis | B29C 45/60 366/88 |
| 5,318,357 A | * | 6/1994 | Colby | B29C 47/6075 366/319 |
| 5,816,698 A | * | 10/1998 | Durina | B29C 47/60 366/81 |
| 6,497,508 B1 | * | 12/2002 | Womer | B29C 47/6037 366/81 |
| 6,547,431 B1 | * | 4/2003 | Womer | B29C 47/60 366/81 |
| 7,014,353 B2 | * | 3/2006 | Womer | B29C 47/60 366/88 |
| 7,032,843 B1 | | 4/2006 | Johnson et al. | |
| 2004/0141406 A1 | | 7/2004 | Womer et al. | |
| 2011/0222363 A1 | * | 9/2011 | Mazzocca | B29B 7/421 366/81 |
| 2015/0298356 A1 | * | 10/2015 | Williams | B29B 7/482 366/90 |

* cited by examiner

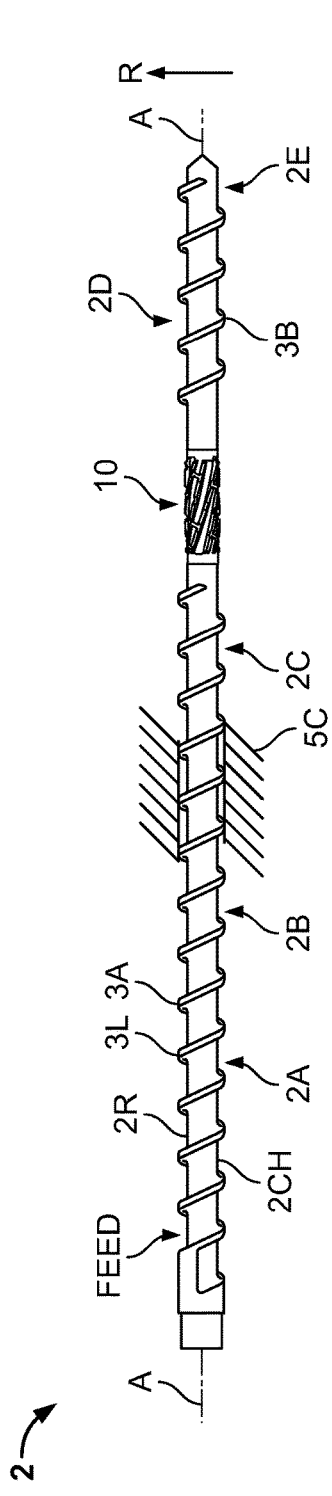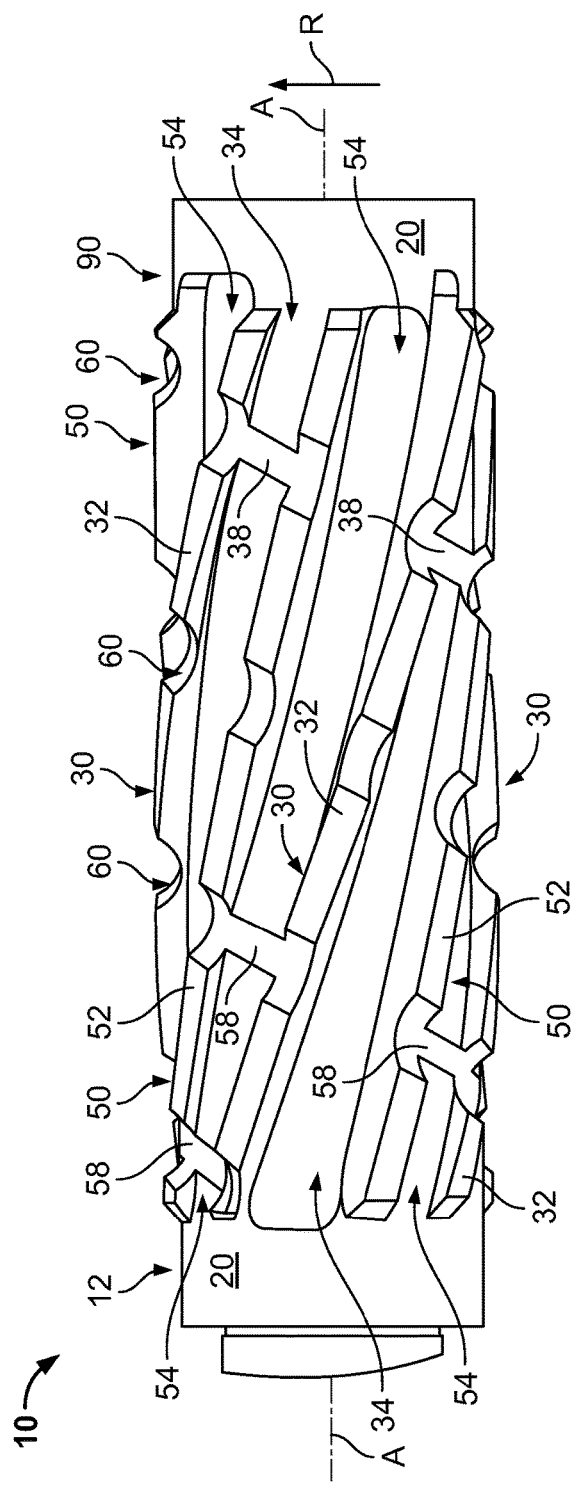

ional patent application Ser. No. 14/600,852 filed on Jan. 20, 2015, which is incorporated herein by reference.

U.S. Non-provisional patent application Ser. No. 14/600, 852 claimed the benefit of U.S. Provisional Patent Application No. 61/928,855 filed on Jan. 17, 2014, which is incorporated herein by reference.

MIXING SECTION FOR PLASTIC EXTRUSION SCREW

CROSS REFERENCES TO RELATED APPLICATIONS

This application is a continuation of U.S. Non-provisional patent application Ser. No. 14/600,852 filed on Jan. 20, 2015, which is incorporated herein by reference.

U.S. Non-provisional patent application Ser. No. 14/600, 852 claimed the benefit of U.S. Provisional Patent Application No. 61/928,855 filed on Jan. 17, 2014, which is incorporated herein by reference.

FIELD

This invention relates to an extrusion screw having an mixing section.

BACKGROUND

The mixing of molten plastic with additives including colorants is an important step prior to extruding the molten plastic into an extruded shape by means of a die or prior to injecting molten plastic into a mold during an injection molding process. Typically, plastic pellets and various additives are fed into the feed of an extrusion machine which typically includes a barrel and an extrusion screw which rotates within the barrel. Typically, the barrel is a precise cylindrical bore having heated walls. The screw is typically an elongated auger like member having a generally cylindrical screw root and a continuous helical ridge or "flight" which projects from the body. The helical flight presents a narrow (typically about 1 cm in width), continuous flat surface which is preferably closely offset from the inside wall of the barrel. Preferably, the flight is configured so that the extrudate does not flow between the flight and the inside wall of the barrel but, rather, is "wiped" from the inside wall. The extrudate is typically a combination of plastic pellets, partially melted plastic pellets, molten plastic and possibly additives. The proportions of unmelted plastic and molten plastic vary depending on whether the extrudate is near the intake or near the outlet. A channel is defined between the turns of the flight. This channel conveys the extrudate down the length of the barrel as the extrusion screw turns within the barrel. In most cases, the extrusion screw includes a feed section in which the depth of the channel is generally constant and relatively deep (on the order of 15 mm for a 100 mm diameter screw), a transition section in which the depth of the channel decreases and a first metering section wherein the depth of the channel is reduced (on the order of 7 mm for a 100 mm diameter screw) and constant. The depth of such a channel is known in the art as the "root depth". Typically, the inside wall of the barrel includes a heating band for melting the plastic pellets into a highly viscous molten plastic material. In order to accomplish thorough mixing, extrusion screws often include a mixing section. The purpose of a mixing section is to mix the molten plastic and additives as much as possible prior to a second metering section which forces the extrudate either into a die or an injection mold.

SUMMARY

The present extrusion screw includes an mixing section. The mixing section has an inlet end for receiving extrudate and an outlet end for discharging extrudate. The mixing section includes a mixing section root, wiping lands and barrier lands. The mixing section root is generally cylindrical in shape. The wiping lands and the barrier lands are arranged on the mixing section root in an alternating fashion and are arranged to describe helixes as they extend from the inlet end to the outlet end. The wiping lands have outside surfaces which generally match the wall of the extrusion barrel. There is an offset between the outside surfaces of the barrier lands and the wall of the extrusion barrel. The wiping lands have a greater helix angle than the barrier lands. The wiping lands and the barrier lands define inlet channels which narrow toward the outlet end. The barrier lands and the wiping lands also define outlet channels which widen toward the outlet end.

Mixing channels are cut into the wiping lands and the barrier lands. The mixing channels are arranged to define helixes which are oriented generally at right angles to the wiping lands and the barrier lands. Accordingly, the mixing channels present channel wall surfaces that are oriented approximately at right angles to the wiping lands and the barrier lands. Because of this opposing orientation of the mixing channel wall surfaces in relation to the wiping lands and the barrier lands, a portion of the extrudate flowing from the inlet end to the outlet end changes direction when that portion of the extrudate encounters the inside wall surfaces of the mixing channels. This alteration of direction of a portion of the extrudate causes increased mixing of the extrudate.

BRIEF DESCRIPTION OF THE DRAWINGS

FIG. 1 is a side elevation view of an embodiment of an extruder screw including a mixing section.

FIG. 2 is a side elevation view of one embodiment of the mixing section.

DETAILED DESCRIPTION

Figure 3:
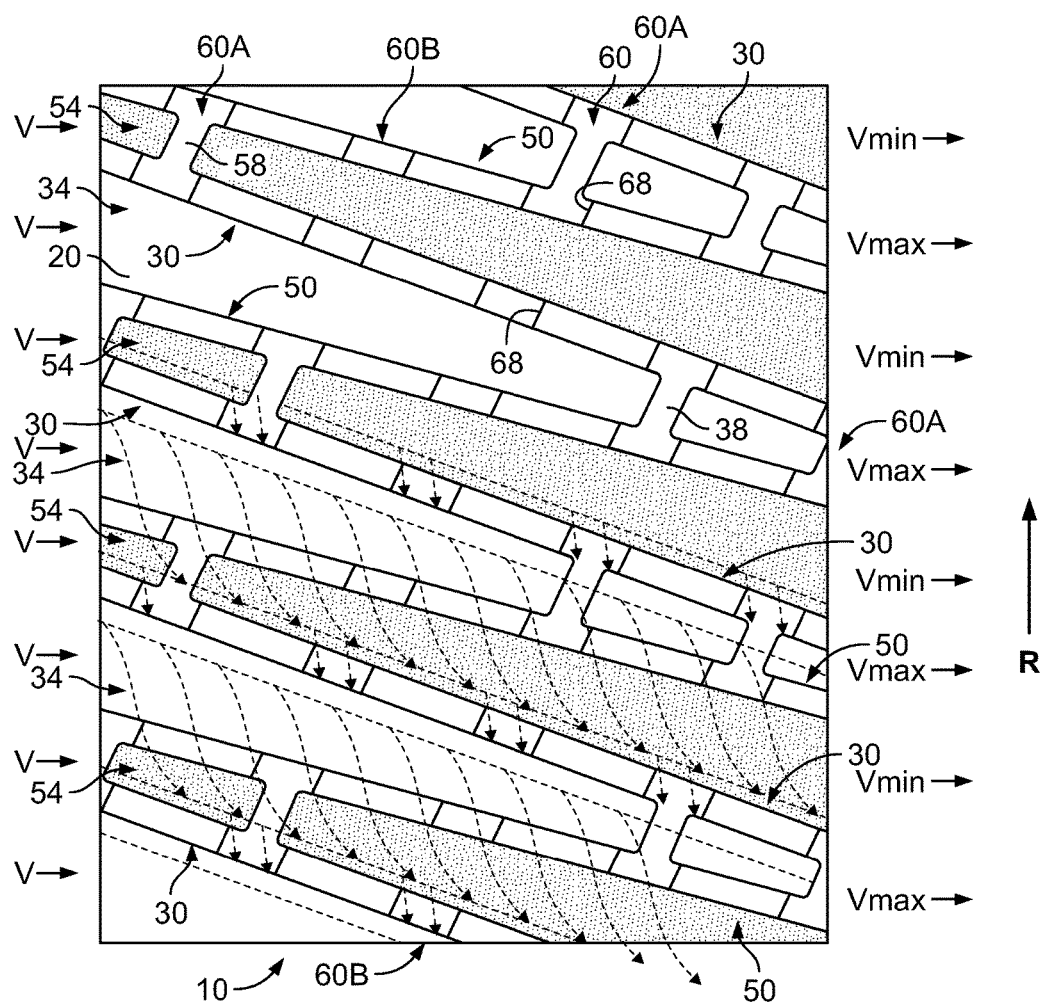
FIG. 3 is a planar projection of the one embodiment of the mixing section shown in FIG. 2.

Referring to the drawings, FIGS. 1 and 2 show an extrusion screw 2 which includes an example embodiment of a mixing section 10. Extrusion screw 2 is arranged to rotate in the direction indicated by arrow R within an extrusion barrel 5 which is shown only partially in FIG. 1. The skilled reader will appreciate that extrusion barrel 5 extends at least the entire length of extrusion screw 2. The skilled reader will also appreciate that extrusion barrel 5 presents a precisely defined cylindrical bore for receiving extrusion screw 2 and will typically include heating bands usually disposed near the feed end for heating and melting plastic extrudate. Reference is also made to U.S. Pat. No. 5,215,764 which is incorporated herein by reference.

Extrusion screw 2 as shown in FIG. 1 is intended as an example of a typical extrusion screw and is by no means representative of all of the extrusion screws which may incorporate a mixing section 10. As can be seen in FIG. 1, extrusion screw 2, is intended to rotate in the direction indicated by arrow R about its longitudinal axis A. Extrusion screw 2 includes a feed section 2A, a transition section 2B, a first metering section 2C, a mixing section 10, and a second metering section 2D and finally an outlet 2E. In this example, a first continuous helical flight 3A extends from the inlet end of the feed section 2A to the outlet end of the first metering section 2C. The helical flight extends radially outward from screw root 2R and is disposed at a helix angle of approximately between 15 and 20 degrees. By way of explanation, a flight having a helix angle of 0 degrees would merely be a ring-like radial band which is perpendicular to axis A and which encircles the screw root. Such a flight would probably have no useful function. Conversely, a flight having a helix angle of 90 degrees would be a longitudinal ridge which would be perfectly aligned with axis A and would also probably have no useful function. However, a flight which is disposed at an angle greater than 0 degrees and significantly less than 90 degrees will define an auger like archimedean screw, which is, so to speak, the archetypal design for devices that pump liquids in a continuous fashion. Accordingly, flight 3A is adapted for pumping extrudate from the feed end to the outlet of metering section 2C as extrusion screw 2 rotates in the direction indicated by direction arrow R.

As can be seen in FIG. 1, fight 3A of extrusion screw 2 has a flat outer land surface 3L that closely matches the inside surface of extrusion barrel 5. Land surface 3L does not necessarily have to precisely match the wall of barrel 5, but the offset between land surface 3L and the barrel wall is preferably sufficiently small to prevent any significant flow of extrudate between those surfaces. A slight gap is preferred so that a small amount of extrudate may be present between land surface 3L and the barrel wall. This small amount of extrudate, which is constantly replaced, acts as a lubricant. A flight or "land" which is closely offset from the inside wall of an extrusion barrel so as to prevent a significant flow of extrudate between the land and the barrel wall is referred to by those skilled in the art as a "wiping land" because wiping lands tend to wipe the inside wall of the barrel clean of extrudate. A flight or "land" which is sufficiently offset from the inside wall of an extrusion barrel so as to permit the flow of extrudate between the land and the barrel wall is referred to by those skilled in the art as a "barrier land" because barrier lands tend to present an obstacle to the passage of extrudate but do not completely prevent the passage of extrudate. A channel 2CH is defined between turns of flight 3A. This channel conveys extrudate and the depth of this channel changes depending on the location along screw 2. In this example, in feed section 2A, screw root 2R has a relatively small diameter which results in a relatively deep channel 2CH. In transition section 2B, the diameter of screw root 2R increases so that the depth of channel 2CH is reduced between the inlet end and the outlet end of transition section 2B. First metering section 2C has a generally constant screw root diameter and a corresponding generally constant channel depth. The same can be said of second metering section 2D. Second metering section 2D is adapted to receive mixed extrudate from mixing section 10 and present the extrudate in a continuous, controlled flow to the outlet of the extrusion machine. As noted above, in this example, mixing section 10 is interposed between first metering section 2C and second metering section 2D. Mixing section 10 will be described in greater detail below.

FIG. 2 provides an enlarged view of an example embodiment of mixing section 10. FIG. 3 provides a projection view in which most of mixing section 10 is projected onto a plane. As can be seen in greater detail in FIG. 2, mixing section 10 is also generally cylindrical. Mixing section 10, like extrusion screw 2, is arranged to rotate about axis A and because mixing section 10 is fixed to extrusion screw 2, it also rotates in the direction indicated by direction arrow R in FIG. 2. Mixing section 10 may also be considered as having an inlet end 12 and an outlet end 90.

As can be seen in FIG. 2 and in greater detail in FIG. 3, mixing section 10 includes a mixing section root 20, wiping lands 30 and barrier lands 50. Mixing section root 20 is preferably cylindrical and may be considered as a reference surface from which the relative radial height or depth of other features of mixing section 10 may be measured. In this example embodiment, wiping lands 30 include four wiping lands 30 (as can be best seen in FIGS. 3 and 6) which are preferably evenly spaced around root 20. In this example wiping lands 30 are set at a first helix angle. In the example mixing section shown in FIGS. 2 and 3, wiping lands 30 have a helix angle of approximately 70 degrees. Wiping lands 30 extend outwardly from mixing section root 20 and present flat, ridge like outside surfaces 32 which are preferably closely offset from the inside surface of extrusion barrel 5. Outside surfaces 32 of wiping lands 30 tend to wipe the inside surface of extrusion barrel 5 clean of extrudate as described above.

FIGS. 2 and 3 also illustrate a set of barrier lands 50 which also extend out from mixing section root 20. Barrier lands 50 are arranged in an alternating fashion between wiping lands 30 so that barrier lands 50 are evenly spaced with each other and evenly spaced with respect to wiping lands 30. Accordingly, there are also four barrier lands 50. In this example embodiment, barrier lands 50 are set at a second helix angle that is greater than the first helix angle of wiping lands 30. In the example shown in FIGS. 2 and 3, the helix angle of barrier lands 50 is approximately 75 degrees. Barrier lands 50 present ridge-like flat outside surfaces 52 that are offset from the inside surface of extrusion barrel 5 preferably with a sufficient offset distance to allow a portion of the extrudate to flow between outside surfaces 52 and the barrel wall.

Because barrier lands 50 have a greater helix angle than wiping lands 30 when considered in the direction of rotation R, the alternating spaces between barrier lands 50 and wiping lands define inlet channels 34 which decrease in width from the inlet end to the outlet end. In this example embodiment, inlet channels 34 decrease in depth from the inlet end to the outlet end. Thus, since inlet channels 34 are wider and may also be deeper at the inlet end, inlet channels 34 are relatively open to the flow of extrudate at their inlet ends and relatively closed to the flow of extrudate at their outlet ends. Accordingly, each inlet channel 34 presents a first channel area at (when considered on a plane which is normal to axis A) at its inlet end which is greater than a second channel area at its outlet end.

Similarly, also because barrier lands 50 have a greater helix angle than wiping lands 30, the alternating spaces between barrier lands 50 and wiping lands 30 when considered in the direction opposite from the direction of rotation R define outlet channels 54 which increase in width from the inlet end to the outlet end. Further, outlet channels 54 may also increase in depth from their inlet ends to their outlet ends. Accordingly, because the cross section areas of outlet channels 54 (when projected on a plane normal to axis A) increase between their inlet ends and their outlet ends, outlet channels 54 are relatively closed to the flow of extrudate at their inlet ends and relatively open to the flow of extrudate at their outlet ends.

As can be seen in FIGS. 2 and 3, mixing channels 60 are cut primarily into wiping lands 30 and barrier lands 50. In this example embodiment, the profile of mixing channels 60 describes a generally arc shaped cross section. Further, in this example embodiment, mixing channel portions 38 also extend between wiping lands 30 and barrier lands 50 in inlet channels 34 near the outlet ends of inlet channels 34. Similarly, mixing channel portions 58 are also defined between barrier lands 50 and wiping lands 30 near the inlet ends of outlet channels 54.

Figure 4:
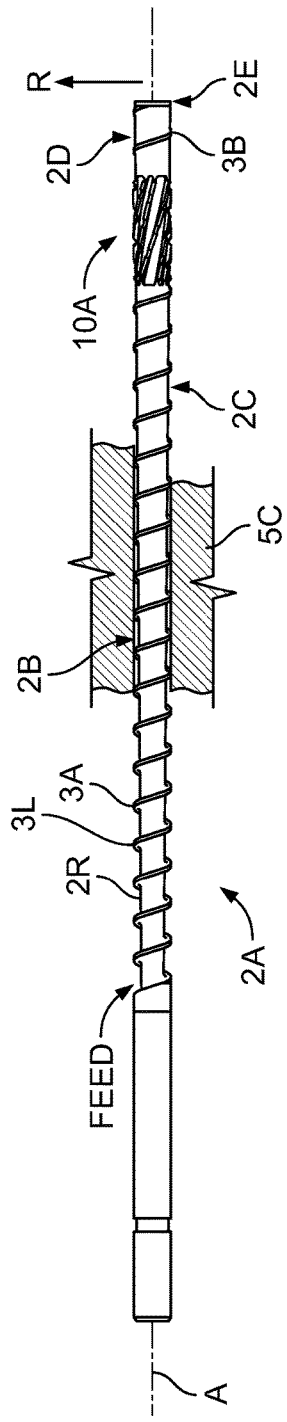
FIG. 4 is a side elevation view of a second embodiment of an extruder screw including a mixing section.
Figure 5:
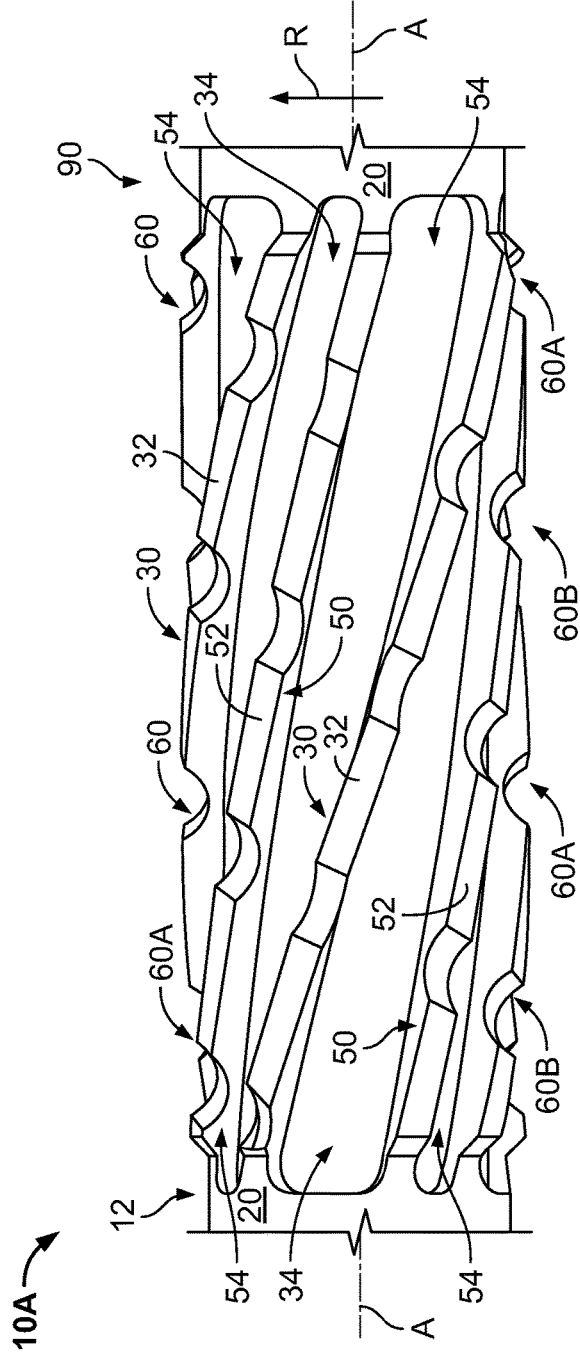
FIG. 5 is a side elevation view of a second embodiment of the mixing section.
Figure 6:
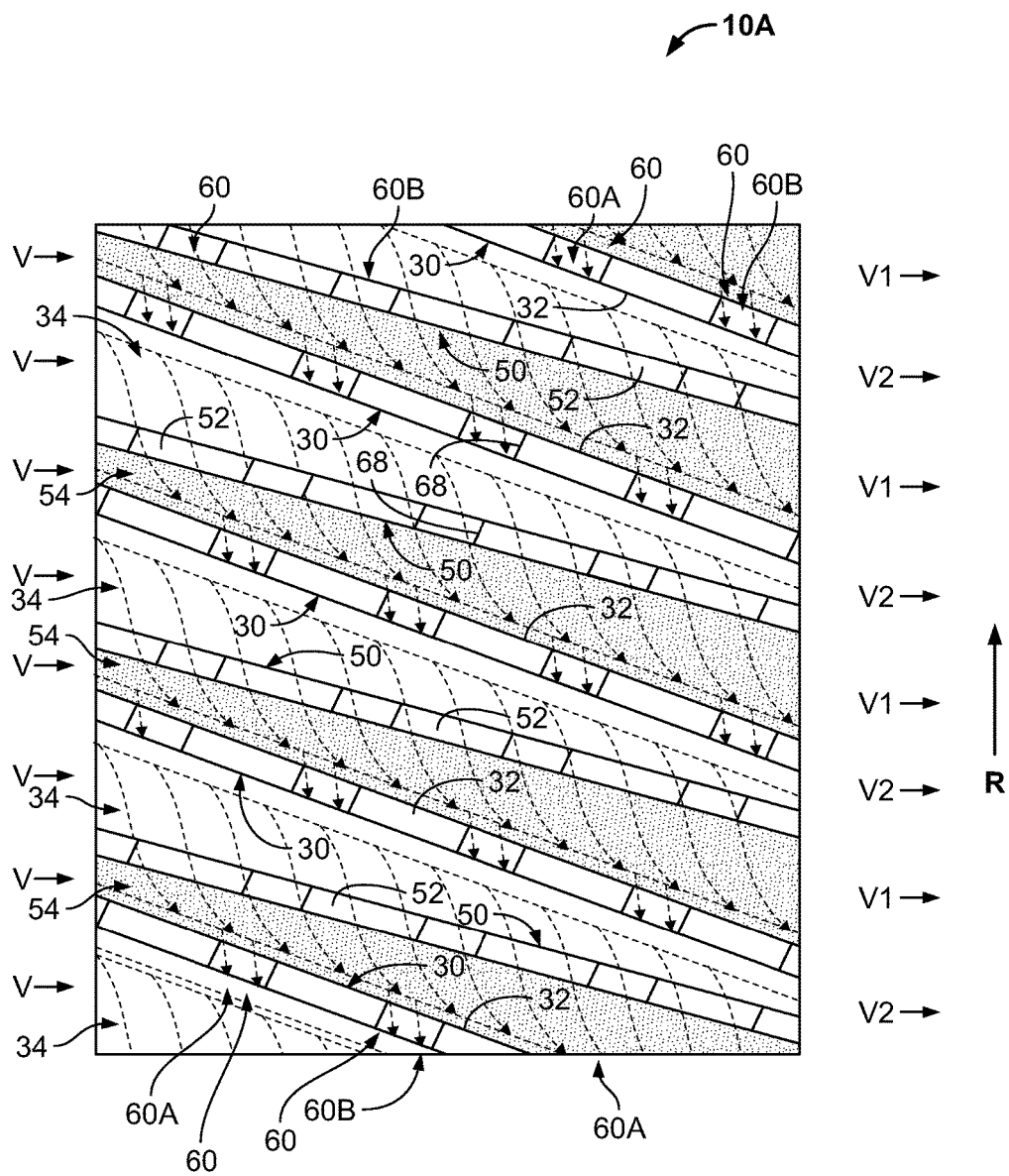
FIG. 6 is a planar projection of the mixing section shown in FIG. 2.

FIGS. 4-6 and in particular FIGS. 5 and 6 illustrate a second example embodiment mixing section 10A. Mixing section 10A is very similar to mixing section 10, except inlet channels 34 and outlet channels 54 are either relatively constant in depth or at least have sufficient depth throughout their so that, at no point, do mixing channels 60 cut into the floors of either inlet channels 34 and outlet channels 54. Accordingly, mixing channel portions 38 and 58 are not present in mixing section 10A. This illustrates that various configurations may be selected to meet differing requirements while remaining within the scope of this invention. However, it remains the case for mixing section 10A that the cross sectional areas of inlet channels 34 increase between their inlets and outlets and that the cross sectional areas of outlet channels 54 decrease between their inlets and outlets.

In this example, as can be best seen in FIG. 3, mixing channels 60 are arranged in two flights (60A and 60B in FIG. 3) which are oriented at slightly more than a right angle to wiping lands 30. Accordingly, mixing channels 60, in this example, have a helix angle of approximately −30 degrees. (In this connection, the skilled reader should recall that a feature such as a wiping land, a barrier land or a channel having a positive helix angle, given the direction of rotation, will cause extrudate to be forced from the inlet end to the outlet end of an extrusion screw or a portion thereof. Conversely, a feature such as a channel having a negative helix angle would tend to urge extrudate to counter-flow in an opposite direction generally from the outlet end toward the inlet end.) Because of the helix angle of −30 degrees, mixing channels 60 present surfaces which the extrudate encounters as it flows from the inlet end to the outlet end.

The skilled reader may be able to imagine how the various surfaces of the wiping lands, barrier lands and mixing channels might interact with the extrudate as extrudate progresses through mixing section 10. As mixing section 10 rotates in direction R, extrudate will be pushed down inlet channels 34 and over barrier lands 50 and into outlet channels 54. As this flow from inlet channels 34 into outlet channels 54 occurs, the positive large helix angles of wiping lands 30 and barrier lands 50 and the direction of rotation R causes wiping lands 30 and barrier lands 50 to spiral from the inlet end toward the outlet end consistent with the general direction of the flow of the extrudate thereby forcing the extrudate to generally flow from the inlet end toward the outlet end and also from the inlet channels into the outlet channels in an Archimedian fashion. However, the negative helix angle of mixing channels 60, causes the mixing channels to progress in a direction that is at least partially opposite from the flow direction of the extrudate when mixing section 10 is turned in direction of rotation R. Consequently, as extrudate flowing from inlet channels 30 to outlet channels 50 encounters mixing channel surfaces 68, a portion of the extrudate is redirected in a direction that is different from the remainder of the extrudate and this different direction may be understood, at least in relative terms, as if that portion of extrudate is counter-flowing in relation to the remainder of the extrudate. This redirection of a portion of the extrudate significantly enhances the mixing of the extrudate as it passes through mixing section 10.

The skilled reader will readily appreciate that the above described mixing section 10 provides an extrusion screw with significant advantages. The mixing of extrudate is significantly enhanced by presenting flights of mixing channels arranged at a helix angle which is roughly at right angles to the wiping lands of the mixing section in order to present mixing channel surfaces which progress in a counter-flow fashion as the mixing section rotates. Extrudate which encounters the mixing channel surfaces moving in a counter-flow direction, changes direction thereby enhancing the mixing of the extrudate.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A mixing section for an extrusion screw, comprising:
   (a) an inlet end for receiving extrudate and an outlet end for discharging extrudate,
   (b) multiple wiping lands and multiple barrier lands which extend between the inlet end and the outlet end of the mixing section, both the wiping lands and the barrier lands having a positive helix angle such that the wiping lands have a helix angle of at least 65 degrees and the barrier lands have a greater helix angle than the wiping lands, the wiping lands and the barrier lands arranged such that barrier lands do not cross or intersect with the wiping lands, the wiping lands and the barrier lands defining alternating inlet channels and outlet channels such that there are at least three inlet channels and at least three outlet channels defined on the mixing section,
   (c) mixing channels which are defined in the wiping lands and the barrier lands, the mixing channels arranged to define a negative helix angle which is offset at least substantially 90 degrees from the helix angle of the wiping lands so that the mixing channels are arranged generally normal or with an offset of more than 90 degrees to the wiping lands.

2. The mixing section of claim 1, wherein:
the helix angle of the wiping lands is at least 70 degrees and the helix angle of the barrier lands is at least 5 degrees greater than the helix angle of the wiping lands.

3. The mixing section of claim 1, wherein:
the depth of each inlet channel varies between the inlet end and the outlet end and the depth of each outlet channel varies between the inlet end and the outlet end.

4. The mixing section of claim 1, wherein:
the depth of each inlet channel decreases from the inlet end to the outlet end and the depth of each outlet channel increases from the inlet end to the outlet end.

5. The mixing section of claim 1, wherein:
at least a portion of one of the mixing channels is defined across the surface between the wiping land and the barrier land in each inlet channel and each outlet channel.

6. A thermoplastic extrusion screw for rotation within an extrusion barrel, the extrusion screw comprising
   (a) a generally cylindrical, elongated screw root that is rotatable about a longitudinal axis within an extrusion barrel,
   (b) a metering section disposed along the screw root, the metering section having at least one helical wiping land which extends from the screw root to the inside surface of the extrusion barrel, the at least one helical wiping land defining at least one channel for conveying extrudate through the metering section, (c) a mixing section downstream of the metering section, the mixing section including:
  (i) a generally cylindrical mixing section root having an inlet end and an outlet end,
  (ii) at least four wiping lands extending outwardly from the mixing section root, the wiping lands having side surfaces and outside surfaces, the outside surfaces sufficiently matching the inside wall of the extrusion barrel to substantially prevent the flow of extrudate between the outside surfaces of the wiping lands and the barrel wall, the wiping lands disposed on the mixing section root in a helical fashion with a first positive helix angle of at least 65 degrees, the first helix angle suitable for defining wiping lands that urge extrudate from the inlet end toward the outlet end of the mixing section as the mixing section rotates within the barrel,
  (iii) barrier lands arranged in an cooperating fashion with the wiping lands, the barrier lands also extending outwardly from the mixing section body, the barrier lands having side surfaces, the barrier lands also having outside surfaces sufficiently offset from the inside wall of the extrusion barrel to permit a portion of the extrudate to flow between the barrier lands and the barrel wall, the barrier lands having a second helix angle that is greater than the first helix angle of the wiping lands, the barrier lands arranged to not cross or intersect with the wiping lands,
  (iv) the adjacent wiping lands and barrier lands defining inlet channels each of which extend between an inlet end and an outlet end, the inlet channels decreasing in cross sectional area between their inlet ends and their outlet ends,
    (v) the adjacent barrier lands and wiping lands also defining outlet channels between the inlet channels, each outlet channel extending between an inlet end and an outlet end, the outlet channels increasing in cross sectional area between their inlet ends and their outlet ends,
  (vi) mixing channels defined in the wiping lands and the barrier lands, the mixing channels being arranged to define a negative helix angle such that mixing channels cross the wiping lands at a generally normal angle or with an offset of more than 90 degrees.

7. The extrusion screw of claim 6, wherein:
the depth of each inlet channel of the mixing section decreases from the inlet end toward the outlet end and the depth of each outlet channel increases from the inlet end to the outlet end.

8. The extrusion screw of claim 6, wherein:
at least a portion of one of the mixing channels of the mixing section is defined across the surface between the wiping land and the barrier land in each inlet channel and each outlet channel.

9. The extrusion screw of claim 6, wherein:
the helix angle of the wiping lands are between 65 and 80 degrees.

10. The extrusion screw of claim 6, wherein:
the helix angle of the wiping lands are between 65 and 80 degrees and the helix angle of the barrier lands is at least 5 degrees-greater than the helix angle of the wiping lands.

11. The extrusion screw of claim 6, wherein:
the helix angle of the mixing channels is offset at least 90 degrees from the helix angle of the wiping lands.

12. The extrusion screw of claim 6, wherein:
the barrier lands and the wiping lands correspond to each other in their number.

13. The extrusion screw of claim 12, wherein:
the barrier lands and the wiping lands are arranged in an alternating fashion around the extrusion screw.

\* \* \* \* \*